(12) United States Patent
Huang et al.

(10) Patent No.: US 9,039,185 B2
(45) Date of Patent: May 26, 2015

(54) LCOS PROJECTION SYSTEM HAVING BEAM RECYCLING MODULE WITH TOTAL INTERNAL REFLECTING PRISM

(71) Applicant: MIN AIK TECHNOLOGY CO., LTD., Taoyuan County (TW)

(72) Inventors: Shi-Hwa Huang, New Taipei (TW); Mao-Sheng Hsu, Tao Tuan (TW); Ming-Hsien Tsai, Tao Tuan (TW); Chi-Wei Chen, Tao Tuan (TW)

(73) Assignee: MIN AIK TECHNOLOGY CO., LTD., Taoyuan County (TW)

( * ) Notice: Subject to any disclaimer, the term of this patent is extended or adjusted under 35 U.S.C. 154(b) by 254 days.

(21) Appl. No.: 13/683,269

(22) Filed: Nov. 21, 2012

(65) Prior Publication Data
US 2013/0162954 A1 Jun. 27, 2013

(30) Foreign Application Priority Data
Dec. 22, 2011 (TW) .............................. 100148081 A

(51) Int. Cl.
*G03B 21/14* (2006.01)
*G03B 21/20* (2006.01)
*H04N 9/31* (2006.01)

(52) U.S. Cl.
CPC ............ *G03B 21/2073* (2013.01); *G03B 21/14* (2013.01); *G03B 21/2066* (2013.01); *G03B 21/208* (2013.01); *H04N 9/3152* (2013.01); *H04N 9/3167* (2013.01); *H04N 9/3111* (2013.01)

(58) Field of Classification Search
CPC .... G03B 21/00; G03B 21/005; G03B 21/006; G03B 21/14; G03B 21/20; G03B 21/2066; G03B 21/2073; G03B 21/208; G03B 21/2093; H04N 9/31; H04N 9/3141; H04N 9/315; H04N 9/3152; H04N 9/317; H04N 9/3197
USPC ................. 353/20, 30–31, 33–34, 37, 48–51, 353/81–82; 359/485.01, 485.06–485.07, 359/831, 833–834; 348/751, 756–757, 790
See application file for complete search history.

(56) References Cited

U.S. PATENT DOCUMENTS

| | | | |
|---|---|---|---|
| 6,536,902 B2 * | 3/2003 | Lee .................................. | 353/20 |
| 6,646,806 B1 * | 11/2003 | Bierhuizen ................... | 359/618 |
| 7,048,380 B2 * | 5/2006 | Sokolov .......................... | 353/20 |
| 7,560,710 B2 * | 7/2009 | Berman et al. ............. | 250/461.1 |
| 8,098,339 B2 * | 1/2012 | Huang ............................. | 349/5 |
| 8,134,109 B2 * | 3/2012 | Tang .......................... | 250/208.1 |
| 8,248,695 B2 * | 8/2012 | Sacre et al. .............. | 359/485.01 |

(Continued)

*Primary Examiner* — Jori S Reilly-Diakun
(74) *Attorney, Agent, or Firm* — WPAT, PC; Justin King

(57) ABSTRACT

A LCOS projection system includes an illumination device, a LCOS microdisplay element, a polarization beam splitter, an optical projection lens, and a beam recycling module. A first portion of the lighting beams provided by the illumination device are transmissible through the polarization beam splitter and directed to the LCOS microdisplay element. A second portion of the lighting beams provided by the illumination device and from the polarization beam splitter are introduced into the beam recycling module. By the beam recycling module, a polarization state of the second portion of the lighting beams is converted. Consequently, the second portion of the lighting beams in the converted polarization state can also be projected onto the LCOS microdisplay element. The beam recycling module includes a total internal reflection prism, which is arranged in a transmission path of the first portion and the second portion of the lighting beams.

28 Claims, 9 Drawing Sheets

(56) References Cited

U.S. PATENT DOCUMENTS

| | | | |
|---|---|---|---|
| 8,654,444 B2* | 2/2014 | Ouderkirk et al. | 359/487.04 |
| 2004/0090763 A1* | 5/2004 | Li et al. | 362/19 |
| 2007/0120077 A1* | 5/2007 | Berman et al. | 250/504 R |
| 2008/0055721 A1* | 3/2008 | Perkins et al. | 359/486 |
| 2008/0174868 A1* | 7/2008 | Schuck et al. | 359/487 |
| 2009/0128780 A1* | 5/2009 | Schuck et al. | 353/20 |
| 2009/0161076 A1* | 6/2009 | Chen et al. | 353/31 |
| 2011/0007392 A1* | 1/2011 | English et al. | 359/495 |
| 2011/0235175 A1* | 9/2011 | Poon et al. | 359/487.04 |
| 2013/0076995 A1* | 3/2013 | Huang et al. | 349/9 |
| 2013/0169893 A1* | 7/2013 | Ouderkirk et al. | 349/8 |
| 2014/0253879 A1* | 9/2014 | Schuck et al. | 353/8 |

* cited by examiner

LCOS PROJECTION SYSTEM HAVING BEAM RECYCLING MODULE WITH TOTAL INTERNAL REFLECTING PRISM

FIELD OF THE INVENTION

The present invention relates to a projection system, and more particularly to a LCOS (liquid crystal on silicon) projection system.

BACKGROUND OF THE INVENTION

A projection system is widely used in our daily lives to project texts/pictures or image data onto a screen in order to facilitate many people to view the enlarged texts/pictures or image data in a visually comfortable manner. Recently, the general trends in designing electronic devices are toward small size, light weightiness and easy portability to meet the requirements of humanization. Similarly, the projection system is developed toward miniaturization. As a consequence, the projection system can be applied to electronic devices such as 3G mobile phones or personal digital assistants (PDAs). In addition, a small-sized projection system becomes a portable electronic device. On account of its portability, the user may use a small-sized projection system to watch movies everywhere they are, and thus the amusement purpose can be achieved without difficulty.

FIG. 1 is a schematic view illustrating the structure and the optical paths of a conventional LCOS projection system. As shown in FIG. 1, the LCOS projection system 1 comprises an illumination device 11, a collimating lens assembly 12, a polarization beam splitter (PBS) 13, a field lens 14, a LCOS microdisplay element 15, and an optical projection lens 16. The polarization beam splitter 13 comprises two prisms, wherein a reflective polarizing film 131 is formed on the interface between these two prisms. The polarization beam splitter 13 is arranged between the illumination device 11, the LCOS microdisplay element 15 and the optical projection lens 16. The collimating lens assembly 12 is arranged between the illumination device 11 and the polarization beam splitter 13. The field lens 14 is arranged between the LCOS microdisplay element 15 and the polarization beam splitter 13.

The collimating lens assembly 12 and the field lens 14 are used for adjusting the incidence angles of the received light beams and outputting the adjusted light beams. The P-polarized beams are transmissible through the reflective polarizing film 131 of the polarization beam splitter 13. Whereas, the S-polarized beams are reflected by the reflective polarizing film 131.

Moreover, the LCOS microdisplay element 15 is used for showing an electronic image. The illumination device 11 is used for providing a source ray to the LCOS microdisplay element 15. Consequently, a plurality of lighting paths are created between the illumination device 11 and the LCOS microdisplay element 15, and a plurality of imaging paths are created between the LCOS microdisplay element 15 and the optical projection lens 16. The electronic image is then projected onto a screen 9 through the optical projection lens 16.

Please refer to FIG. 1 again. The source ray provided by the illumination device 11 may be divided into two parts, i.e. P-polarized lighting beams $L_{1P}$ and S-polarized lighting beams $L_{1S}$. The P-polarized lighting beams $L_{1P}$ and the S-polarized lighting beams $L_{1S}$ are propagated along the corresponding lighting paths. The solid lines as shown in FIG. 1 denote some of the lighting paths, i.e. the transmission paths of the lighting beams $L_{1P}$ and $L_{1S}$.

The lighting beams $L_{1P}$ and $L_{1S}$ provided by the illumination device 11 are transmitted through the collimating lens assembly 12, and then directed to the reflective polarizing film 131 of the polarization beam splitter 13. The P-polarized lighting beams $L_{1P}$ are transmitted through the polarization beam splitter 13, and directed to other places. The S-polarized lighting beams $L_{1S}$ are reflected by the reflective polarizing film 131 of the polarization beam splitter 13, and directed to the LCOS microdisplay element 15 through the field lens 14. Next, the S-polarized lighting beams $L_{1S}$ are reflected by the LCOS microdisplay element 15. Correspondingly, the S-polarized lighting beams $L_{1S}$ are converted into a plurality of P-polarized imaging beams $I_{1P}$ in response to the electronic image. The P-polarized imaging beams $I_{1P}$ are propagated along the corresponding imaging paths. The dotted lines as shown in FIG. 1 denote some of the imaging paths, i.e. the transmission paths of the P-polarized imaging beams $I_{1P}$.

The P-polarized imaging beams $I_{1P}$ from the LCOS microdisplay element 15 are transmitted through the field lens 14, and directed to the polarization beam splitter 13. Next, the P-polarized imaging beams $I_{1P}$ are transmitted through the reflective polarizing film 131 of the polarization beam splitter 13, and directed to the optical projection lens 16. Consequently, the electronic image shown on the LCOS microdisplay element 15 is projected onto the screen 9 through the optical projection lens 16.

From the above discussions, only the lighting beams in a specified polarization state need to be provided to the LCOS microdisplay element 15. During the lighting beams $L_{1P}$ and $L_{1S}$ provided by the illumination device 11 are directed to the LCOS microdisplay element 15, only the S-polarized lighting beams $L_{1S}$ are projected onto the LCOS microdisplay element 15. Whereas, since the P-polarized lighting beams $L_{1P}$ are directed to other places, the P-polarized lighting beams $L_{1P}$ are useless and lost. As a consequence, the light amount outputted from the optical projection lens 16 is much lower than the light amount outputted from the illumination device 11.

FIG. 2 is a schematic view illustrating the structure and the optical paths of another conventional LCOS projection system. As shown in FIG. 2, the LCOS projection system 2 comprises an illumination device 21, a collimating lens assembly 22, a reflective polarizer 23, a field lens 24, a LCOS microdisplay element 25, an analyzer 28, and an optical projection lens 26. The reflective polarizer 23 is arranged between the illumination device 21, the LCOS microdisplay element 25 and the optical projection lens 26. The collimating lens assembly 22 is arranged between the illumination device 21 and the reflective polarizer 23. The field lens 24 is arranged between the LCOS microdisplay element 25 and the reflective polarizer 23.

The collimating lens assembly 22 and the field lens 24 are used for adjusting the incidence angles of the received light beams and outputting the adjusted light beams. The P-polarized beams are transmissible through the reflective polarizer 23. The S-polarized beams are reflected by the reflective polarizer 23.

Moreover, the LCOS microdisplay element 25 is used for showing an electronic image. The illumination device 21 is used for providing a source ray to the LCOS microdisplay element 25. Consequently, a plurality of lighting paths are created between the illumination device 21 and the LCOS microdisplay element 25, and a plurality of imaging paths are created between the LCOS microdisplay element 25 and the optical projection lens 26. The electronic image is then projected onto a screen 9 through the optical projection lens 26.

Please refer to FIG. 2 again. The source ray provided by the illumination device 21 may be divided into two parts, i.e. P-polarized lighting beams $L_{2P}$ and S-polarized lighting beams $L_{2S}$. The P-polarized lighting beams $L_{2P}$ and the S-polarized lighting beams $L_{2S}$ are propagated along the corresponding lighting paths. The solid lines as shown in FIG. 2 denote some of the lighting paths, i.e. the transmission paths of the lighting beams $L_{2P}$ and $L_{2S}$.

After the lighting beams $L_{2P}$ and $L_{2S}$ provided by the illumination device 21 are transmitted through the collimating lens assembly 22 and directed to the reflective polarizer 23, the S-polarized lighting beams $L_{2S}$ are reflected to other places by the reflective polarizer 23. The P-polarized lighting beams $L_{2P}$ are sequentially transmitted through the reflective polarizer 23 and the field lens 24, and directed to the LCOS microdisplay element 25. Next, the P-polarized lighting beams $L_{2P}$ are reflected by the LCOS microdisplay element 25. Correspondingly, the P-polarized lighting beams $L_{2P}$ are converted into a plurality of S-polarized imaging beams $I_{2S}$ in response to the electronic image. The S-polarized imaging beams $I_{2S}$ are propagated along the corresponding imaging paths. The dotted lines as shown in FIG. 2 denote some of the imaging paths, i.e. the transmission paths of the S-polarized imaging beams $I_{2S}$.

The S-polarized imaging beams $I_{2S}$ from the LCOS microdisplay element 25 are transmitted through the field lens 24, and directed to the reflective polarizer 23. Next, the S-polarized imaging beams $I_{2S}$ are reflected by the reflective polarizer 23, and directed to the optical projection lens 26 through the analyzer 28. Consequently, the electronic image shown on the LCOS microdisplay element 25 is projected onto the screen 9 through the optical projection lens 26.

From the above discussions, only the lighting beams in a specified polarization state need to be provided to the LCOS microdisplay element 25. During the lighting beams $L_{2P}$ and $L_{2S}$ provided by the illumination device 21 are directed to the LCOS microdisplay element 25, only the P-polarized lighting beams $L_{2P}$ are projected onto the LCOS microdisplay element 25. Whereas, since the S-polarized lighting beams $L_{2S}$ are directed to other places, the S-polarized lighting beams $L_{2S}$ are useless and lost. As a consequence, the light amount outputted from the optical projection lens 26 is much lower than the light amount outputted from the illumination device 21.

From the above discussions, one of the main drawbacks of the conventional LCOS projection system is the low light utilization efficacy of the source ray provided by the illumination device. Consequently, the projection system outputs insufficient luminance and fails to meet the user's requirements. Recently, the LCOS projection system is gradually replaced by a digital light processing (DLP) projection system.

Therefore, there is a need of providing an improved LCOS projection system with enhanced light utilization efficacy.

SUMMARY OF THE INVENTION

The present invention relates to a LCOS (liquid crystal on silicon) projection system, and more particularly to a LCOS projection system with a beam recycling module for reducing light loss.

In accordance with an aspect of the present invention, there is provided a LCOS projection system. The LCOS projection system includes an illumination device, a LCOS microdisplay element, a polarization beam splitter, an optical projection lens, and a beam recycling module. The illumination device is used for providing a plurality of lighting beams. The LCOS microdisplay element is used for showing an electronic image. A first portion of the lighting beams are transmissible through the polarization beam splitter and directed to the LCOS microdisplay element. When the first portion of the lighting beams are reflected by the LCOS microdisplay element, the lighting beams are converted into a plurality of imaging beams in response to the electronic image. The optical projection lens is used for receiving the imaging beams and projecting the imaging beams onto a screen. When a second portion of the lighting beams from the polarization beam splitter are introduced into the beam recycling module, a polarization state of the second portion of the lighting beams is converted by the beam recycling module, and the second portion of the lighting beams in the converted polarization state are directed to the polarization beam splitter again. The beam recycling module at least includes a total internal reflection prism. The lighting beams from the illumination device are transmissible through the total internal reflection prism, and the second portion of the lighting beams from the polarization beam splitter are subject to a total internal reflection on the total internal reflection prism.

In an embodiment, any P-polarized beam of the lighting beams is transmissible through the polarization beam splitter, and any S-polarized beam of the lighting beams is reflected by the polarization beam splitter, wherein the total internal reflection prism is arranged between the illumination device and the polarization beam splitter.

In an embodiment, the total internal reflection prism includes a first prism and a second prism. The first prism includes a first incidence plane and a first facing plane. The second prism includes a second incidence plane and a second facing plane. The first facing plane and the second facing plane face each other. The LCOS projection system has a lighting optical axis. In addition, a first angle between the first facing plane of the first prism and the lighting optical axis and a second angle between the second facing plane of the second prism and the lighting optical axis are both 45 degrees. If the illumination device is deviated from the lighting optical axis, the first prism and the second prism are both right triangular prisms. If the illumination device is not deviated from the lighting optical axis, the first prism and the second prism are collectively combined as a parallelogram prism.

In an embodiment, the LCOS projection system further includes an analyzer. The analyzer is arranged between the polarization beam splitter and the optical projection lens for blocking any P-polarized beam of the imaging beams from being incident into the optical projection lens, or blocking any S-polarized beam of the imaging beams from being incident into the optical projection lens.

In an embodiment, the beam recycling module further includes a polarization state conversion structure for converting the polarization state of the second portion of the lighting beams. In addition, the second portion of the lighting beams from the polarization beam splitter are transmitted through the polarization state conversion structure and then directed to the total internal reflection prism.

In an embodiment, the polarization state conversion structure is a half-wave plate.

In an embodiment, the beam recycling module further includes an optical path management module for changing a propagating direction of the second portion of the lighting beams.

In an embodiment, the LCOS projection system further includes a collimating lens assembly and a first focusing lens assembly. The collimating lens assembly is arranged between the illumination device and the total internal reflection prism for adjusting an incidence angle of any received lighting beam and outputting the adjusted lighting beam. The first focusing lens assembly is arranged between the total internal reflection prism and the polarization beam splitter for adjusting an incidence angle of any received lighting beam and outputting the adjusted lighting beam.

In an embodiment, the optical path management module at least includes a trapezoidal prism. The second portion of the lighting beams from the polarization beam splitter are at least transmitted through the trapezoidal prism, and directed to the second prism of the total internal reflection prism. The optical path management module is arranged between the polarization beam splitter and the trapezoidal prism, or the optical path management module is arranged between the trapezoidal prism and the second prism. Alternatively, the optical path management module at least includes a first reflective element and a second reflective element for reflecting any lighting beam projected thereon and includes a second focusing lens assembly for adjusting an incidence angle of any received lighting beam and outputting the adjusted lighting beam. The second reflective element is arranged between the second focusing lens assembly and the total internal reflection prism. The light intensity and light uniformity of the LCOS microdisplay are changeable according to a position and a tilt angle of the second reflective element.

In an embodiment, the first portion of the lighting beams are P-polarized beams, and the second portion of the lighting beams are S-polarized beams.

In an embodiment, the first reflective element and the second reflective element are respectively a first reflective mirror and a second reflective mirror, or the first reflective element and the second reflective element are respectively a first polarizer and a second polarizer, wherein any P-polarized beam is transmissible through the first polarizer and the second polarizer, and any S-polarized beam is reflected by the first polarizer and the second polarizer. The second portion of the lighting beams from the polarization beam splitter are at least sequentially transmitted through the first reflective element, the second focusing lens assembly, the second reflective element and the second prism of the total internal reflection prism and subject to a total internal reflection on the second facing plane of the second prism. The polarization state conversion structure is arranged between the polarization beam splitter and the first reflective element. Alternatively, the polarization state conversion structure is arranged between the first reflective element and the second focusing lens assembly. Alternatively, the polarization state conversion structure is arranged between the second focusing lens assembly and the second reflective element. Alternatively, the polarization state conversion structure is arranged between the second reflective element and the second prism.

In an embodiment, the first portion of the lighting beams are S-polarized beams, and the second portion of the lighting beams are P-polarized beams.

In an embodiment, the optical path management module further includes a third reflective element for reflecting any lighting beam projected thereon and includes a third focusing lens assembly for adjusting an incidence angle of any received lighting beam and outputting the adjusted lighting beam. The second portion of the lighting beams from the polarization beam splitter are at least sequentially transmitted through the third focusing lens assembly, the first reflective element, the third reflective element, the second focusing lens assembly, the second reflective element and the second prism of the total internal reflection prism and subject to a total internal reflection on the second facing plane of the second prism. The polarization state conversion structure is arranged between the polarization beam splitter and the third focusing lens assembly. Alternatively, the polarization state conversion structure is arranged between the third focusing lens assembly and the first reflective element. Alternatively, the polarization state conversion structure is arranged between the first reflective element and the third reflective element. Alternatively, the polarization state conversion structure is arranged between the third reflective element and the second focusing lens assembly. Alternatively, the polarization state conversion structure is arranged between the second focusing lens assembly and the second reflective element. Alternatively, the polarization state conversion structure is arranged between the second reflective element and the second prism.

In an embodiment, the illumination device has a light source, the light source is a light emitting diode or an ultra-high pressure lamp, and the light source has an illumination range between 0 and 180 degrees, wherein the illumination device is located at a lighting optical axis or located at a side of the lighting optical axis.

In accordance with an aspect of the present invention, there is provided a LCOS projection system. The LCOS projection system includes an illumination device, a LCOS microdisplay element, an optical projection lens, and a beam processing module. The illumination device is used for providing a plurality of first lighting beams in a first polarization state and a plurality of second lighting beams in a second polarization state. The LCOS microdisplay element is used for showing an electronic image. When any lighting beam is directed to and reflected by the LCOS microdisplay element, the lighting beam is converted into an imaging beam in response to said electronic image. The beam processing module is arranged between the illumination device, the LCOS microdisplay element and the optical projection lens. When the first lighting beams in the first polarization state are received by the beam processing module, the first lighting beams in the first polarization state are outputted from the beam processing module to the LCOS microdisplay element. When the second lighting beams in the second polarization state are received by the beam processing module, the second polarization state of the second lighting beams is converted into the first polarization state by the beam processing module, and the second lighting beams in the first polarization state are outputted from the beam processing module to the LCOS microdisplay element. When the imaging beam is received by the beam processing module, the imaging beam is outputted from beam processing module to the optical projection lens. The beam processing module at least includes a total internal reflection prism. The total internal reflection prism is arranged in a transmission path of the second lighting beams after the second polarization state of the second lighting beams is converted into the first polarization state, and the total internal reflection prism is also arranged in a transmission path of the first lighting beams and the second lighting beams from the illumination device.

In an embodiment, the beam processing module further includes a polarization beam splitter, wherein any P-polarized beam is transmissible through the polarization beam splitter, and any S-polarized beam is reflected by the polarization beam splitter. In addition, the total internal reflection prism is arranged between the illumination device and the polarization beam splitter.

In an embodiment, the total internal reflection prism includes a first prism and a second prism. The first prism includes a first incidence plane and a first facing plane. The second prism includes a second incidence plane and a second facing plane. In addition, the first facing plane and the second facing plane face each other. The LCOS projection system has a lighting optical axis. In addition, a first angle between the first facing plane of the first prism and the lighting optical axis and a second angle between the second facing plane of the second prism and the lighting optical axis are both 45 degrees. If the illumination device is deviated from the lighting optical axis, the first prism and the second prism are both right triangular prisms, and if the illumination device is not deviated from the lighting optical axis, the first prism and the second prism are collectively combined as a parallelogram prism.

In an embodiment, the LCOS projection system further includes an analyzer. The analyzer is arranged between the polarization beam splitter and the optical projection lens for blocking any P-polarized beam of the imaging beams from being incident into the optical projection lens, or blocking any S-polarized beam of the imaging beams from being incident into the optical projection lens.

In an embodiment, the beam processing module further includes a polarization state conversion structure for converting the second polarization state of the second lighting beams into the first polarization state. The second lighting beams in the second polarization state and from the polarization beam splitter are transmitted through the polarization state conversion structure and then directed to the total internal reflection prism.

In an embodiment, the polarization state conversion structure is a half-wave plate.

In an embodiment, the beam processing module further includes an optical path management module for changing a propagating direction of the second lighting beams in the second polarization state.

In an embodiment, the beam processing module further includes a collimating lens assembly and a first focusing lens assembly. The collimating lens assembly is arranged between the illumination device and the total internal reflection prism for adjusting an incidence angle of any received lighting beam and outputting the adjusted lighting beam. The first focusing lens assembly is arranged between the total internal reflection prism and the polarization beam splitter for adjusting an incidence angle of any received lighting beam and outputting the adjusted lighting beam.

In an embodiment, the optical path management module at least includes a trapezoidal prism. The second lighting beams in the second polarization state and from the polarization beam splitter are at least transmitted through the trapezoidal prism, and directed to the second prism of the total internal reflection prism. The optical path management module is arranged between the polarization beam splitter and the trapezoidal prism, or the optical path management module is arranged between the trapezoidal prism and the second prism. Alternatively, the optical path management module at least includes a first reflective element and a second reflective element for reflecting any lighting beam projected thereon and includes a second focusing lens assembly for adjusting an incidence angle of any received lighting beam and outputting the adjusted lighting beam. The second reflective element is arranged between the second focusing lens assembly and the total internal reflection prism. The light intensity and light uniformity of the LCOS microdisplay are changeable according to a position and a tilt angle of the second reflective element.

In an embodiment, any lighting beam in the first polarization state is a P-polarized beam, and any lighting beam in the second polarization state is an S-polarized beam.

In an embodiment, the first reflective element and the second reflective element are respectively a first reflective mirror and a second reflective mirror, or the first reflective element and the second reflective element are respectively a first polarizer and a second polarizer, wherein any P-polarized beam is transmissible through the first polarizer and the second polarizer, and any S-polarized beam is reflected by the first polarizer and the second polarizer. The second lighting beams in the second polarization state and from the polarization beam splitter are at least sequentially transmitted through the first reflective element, the second focusing lens assembly, the second reflective element and the second prism of the total internal reflection prism and subject to a total internal reflection on the second facing plane of the second prism. The polarization state conversion structure is arranged between the polarization beam splitter and the first reflective element. Alternatively, the polarization state conversion structure is arranged between the first reflective element and the second focusing lens assembly. Alternatively, the polarization state conversion structure is arranged between the second focusing lens assembly and the second reflective element. Alternatively, the polarization state conversion structure is arranged between the second reflective element and the second prism.

In an embodiment, any lighting beam in the first polarization state is an S-polarized beam, and any lighting beam in the second polarization state is a P-polarized beam.

In an embodiment, the optical path management module further includes a third reflective element for reflecting any lighting beam projected thereon and includes a third focusing lens assembly for adjusting an incidence angle of any received lighting beam and outputting the adjusted lighting beam. The second lighting beams in the second polarization state and from the polarization beam splitter are at least sequentially transmitted through the third focusing lens assembly, the first reflective element, the third reflective element, the second focusing lens assembly, the second reflective element and the second prism of the total internal reflection prism and subject to a total internal reflection on the second facing plane of the second prism. The polarization state conversion structure is arranged between the polarization beam splitter and the third focusing lens assembly. Alternatively, the polarization state conversion structure is arranged between the third focusing lens assembly and the first reflective element. Alternatively, the polarization state conversion structure is arranged between the first reflective element and the third reflective element. Alternatively, the polarization state conversion structure is arranged between the third reflective element and the second focusing lens assembly. Alternatively, the polarization state conversion structure is arranged between the second focusing lens assembly and the second reflective element. Alternatively, the polarization state conversion structure is arranged between the second reflective element and the second prism.

In an embodiment, the illumination device has a light source, the light source is a light emitting diode or an ultra-high pressure lamp, and the light source has an illumination range between 0 and 180 degrees, wherein the illumination device is located at a lighting optical axis or located at a side of the lighting optical axis.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
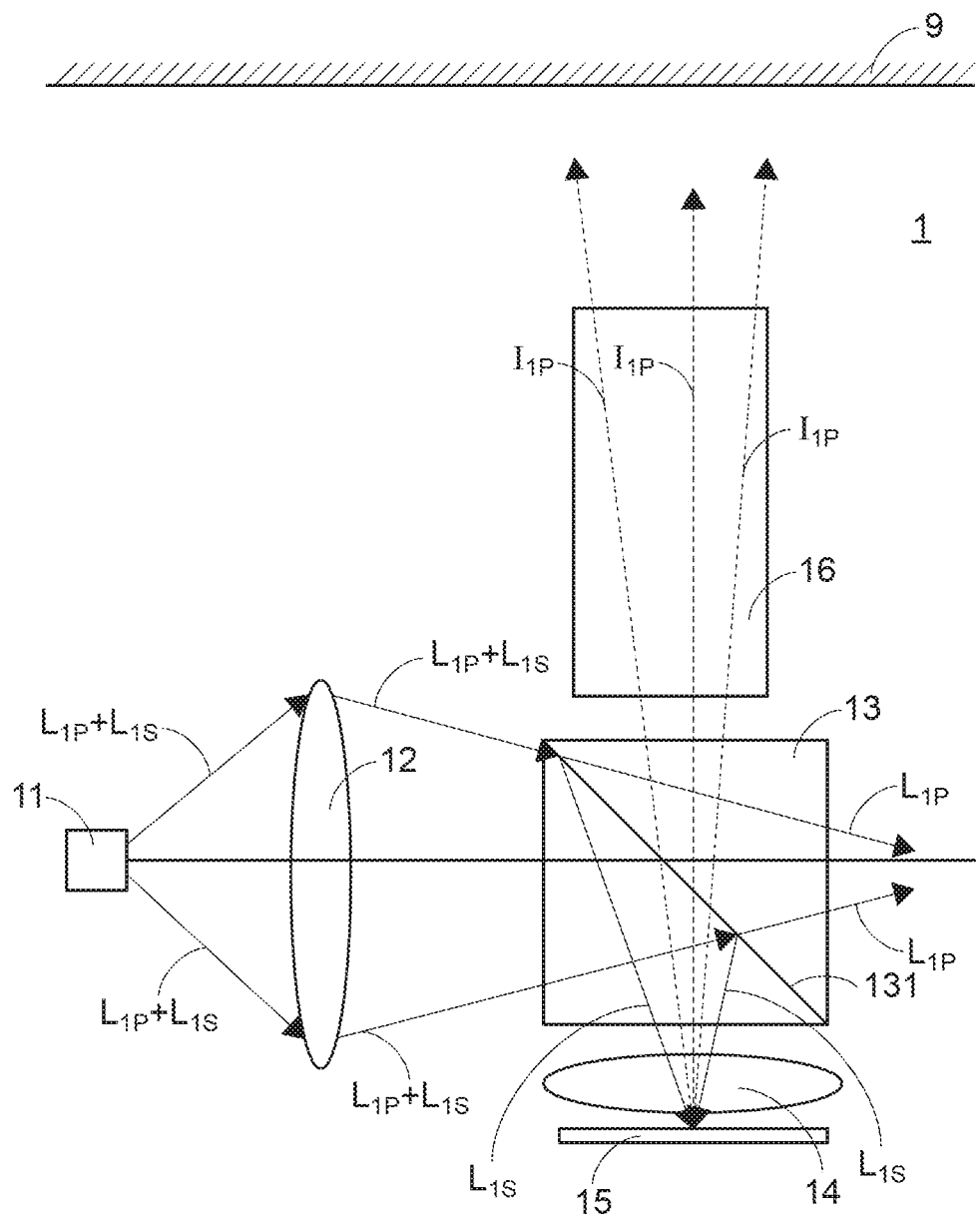
FIG. 1 is a schematic view illustrating the structure and the optical paths of a conventional LCOS projection system.
Figure 2:
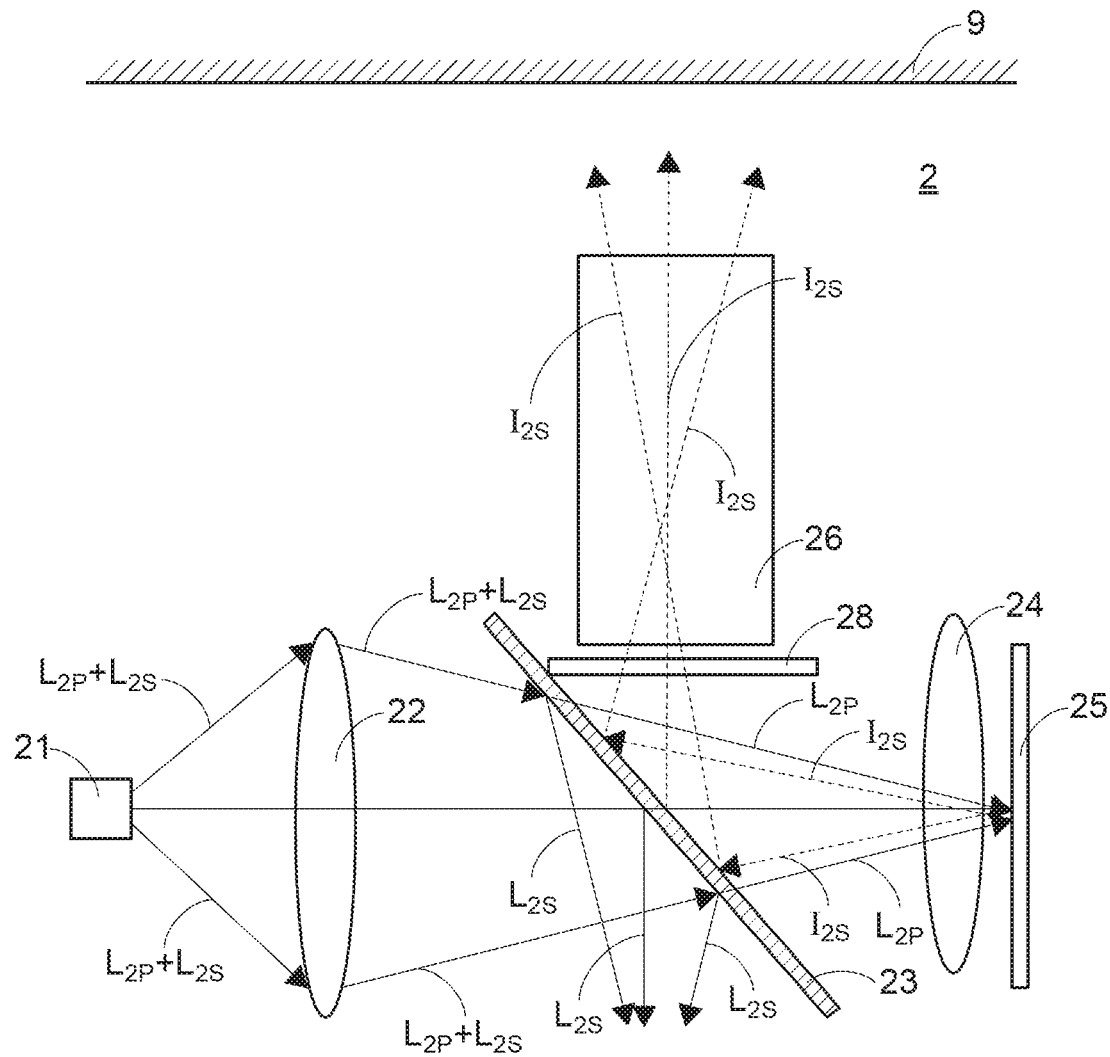
FIG. 2 is a schematic view illustrating the structure and the optical paths of another conventional LCOS projection system.
Figure 3:
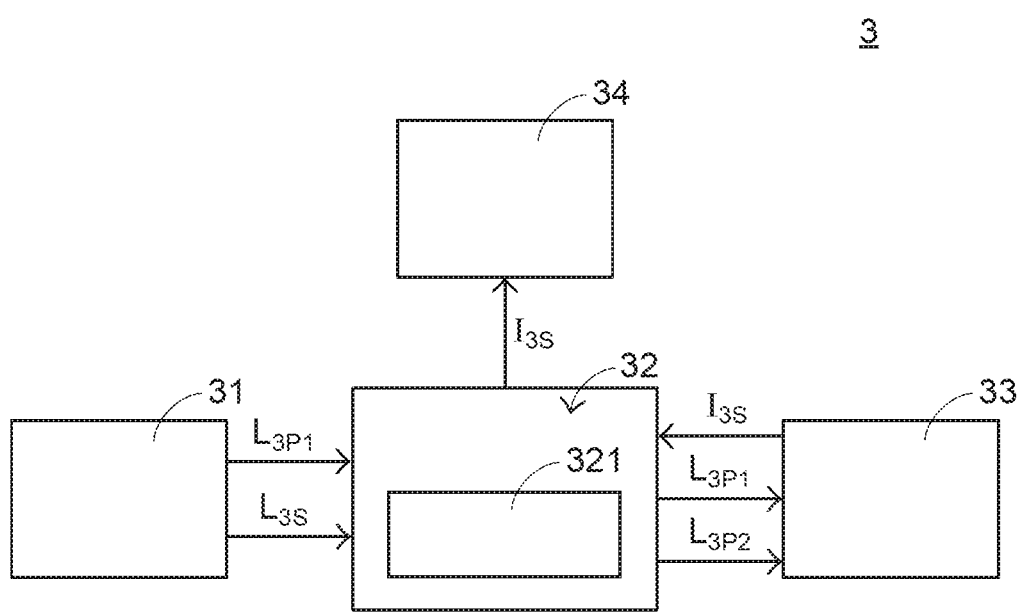
FIG. 3 is a schematic functional block diagram illustrating a projection system according to a first embodiment of the present invention.

FIG. 3 is a schematic functional block diagram illustrating a projection system according to a first embodiment of the present invention. As shown in FIG. 3, the projection system 3 comprises an illumination device 31, a beam processing module 32, a LCOS microdisplay element 33, and an optical projection lens 34. The illumination device 31 has a light source. The light source is for example a light emitting diode (LED) or an ultra-high pressure lamp (UHP lamp). The light source has a wide illumination range. Preferably, the light source has a 180-degree illumination range (e.g. from 0 to 180 degrees). The illumination device 31 is located at a lighting optical axis or located at a side of the lighting optical axis.

The source ray provided by the illumination device 31 may be divided into two parts, i.e. P-polarized lighting beams $L_{3P1}$ and S-polarized lighting beams $L_{3S}$. The LCOS microdisplay element 33 is used for showing an electronic image. Moreover, only the lighting beams in the P-polarized state need to be provided to the LCOS microdisplay element 33. That is, the lighting beams in the S-polarized state are not necessarily provided to the LCOS microdisplay element 33.

In this embodiment, the beam processing module 32 at least comprises a beam recycling module 321. In addition, the beam processing module 32 is arranged between the illumination device 31, the LCOS microdisplay element 33 and the optical projection lens 34. The lighting beams $L_{3P1}$ and $L_{3S}$ provided by the illumination device 31 are directed to the beam processing module 32. The P-polarized lighting beams $L_{3P1}$ are directly outputted to the LCOS microdisplay element 33. More especially, by the beam recycling module 321, the S-polarized lighting beams $L_{3S}$ are converted into P-polarized lighting beams $L_{3P2}$, which are further outputted to the LCOS microdisplay element 33.

Once the P-polarized lighting beams $L_{3P1}$ and $L_{3P2}$ are projected onto the LCOS microdisplay element 33, the P-polarized lighting beams $L_{3P1}$ and $L_{3P2}$ are reflected by the LCOS microdisplay element 33. Correspondingly, the P-polarized lighting beams $L_{3P1}$ and $L_{3P2}$ are converted into the S-polarized imaging beams $I_{3S}$ in response to the electronic image. The S-polarized imaging beams $I_{3S}$ are transmitted through the beam processing module 32, and then directed to the optical projection lens 34. The S-polarized imaging beams $I_{3S}$ are projected onto a screen through the optical projection lens 34. Consequently, the electronic image shown on the LCOS microdisplay element 33 is projected onto the screen.

The present invention will now be described more specifically with reference to the following embodiments. It is to be noted that the following descriptions of preferred embodiments of this invention are presented herein for purpose of illustration and description only. However, those skilled in the art will readily observe that numerous modifications and alterations may be made while retaining the teachings of the invention.

Figure 4:
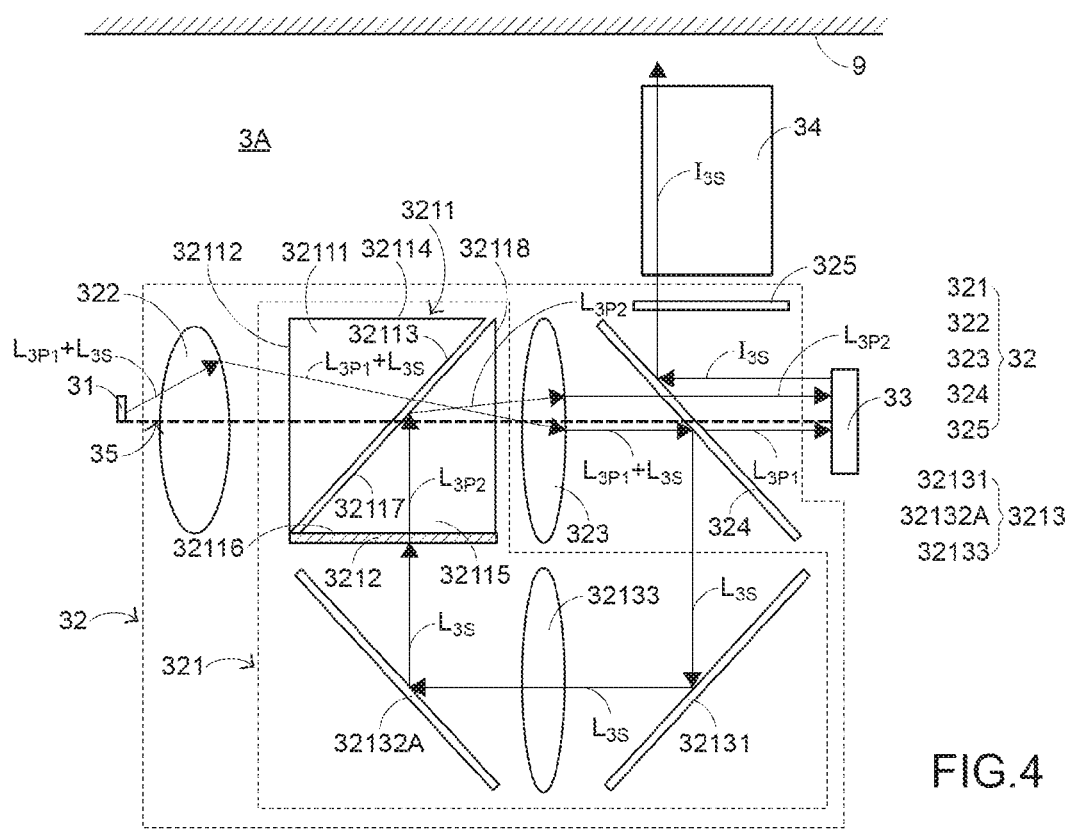
FIG. 4 is a schematic view illustrating the structure and the optical paths of a first exemplary projection system of FIG. 3.

FIG. 4 is a schematic view illustrating the structure and the optical paths of a first exemplary projection system of FIG. 3. In the projection system 3A of FIG. 4, the beam processing module 32 comprises the beam recycling module 321, a collimating lens assembly 322, a first focusing lens assembly 323, a polarization beam splitter (PBS) 324, and an analyzer 325. The beam recycling module 321 comprises a total internal reflection (TIR) prism 3211, a polarization state conversion structure 3212, and an optical path management module 3213.

The collimating lens assembly 322 is arranged between the illumination device 31 and the total internal reflection prism 3211. The first focusing lens assembly 323 is arranged between the total internal reflection prism 3211 and the polarization beam splitter 324. The polarization beam splitter 324 is arranged between the first focusing lens assembly 323 and the LCOS microdisplay element 33. The analyzer 325 is arranged between the polarization beam splitter 324 and the optical projection lens 34.

In the first exemplary projection system 3A, the total internal reflection prism 3211 comprises a first prism 32111 and a second prism 32115. The first prism 32111 and the second prism 32115 are both triangular prisms. The first prism 32111 comprises a first incidence plane 32112, a first facing plane 32113, and a first prism plane 32114. The first prism plane 32114 is arranged between the first incidence plane 32112 and the first facing plane 32113. The second prism 32115 comprises a second incidence plane 32116, a second facing plane 32117, and a second prism plane 32118. The second prism plane 32118 is arranged between the second incidence plane 32116 and the second facing plane 32117. The first facing plane 32113 of the first prism 32111 and the second facing plane 32117 of the second prism 32115 face each other, and are separated from each other by a gap.

The polarization beam splitter 324 is used for passing through the P-polarized beams and reflecting the S-polarized beams. That is, only the P-polarized beams are transmissible through the polarization beam splitter 324. The analyzer 325 is used for blocking the P-polarized beams in order to filter off undesired light beams and prevent the undesired light beams from being directed to the optical projection lens 34. In addition, only the S-polarized beams are transmissible through the analyzer 325. It is noted that the analyzer 325 is not an essential component in this embodiment.

The collimating lens assembly 322 and the first focusing lens assembly 323 are used for adjusting the incidence angles of the received light beams and outputting the adjusted light beams. The light beams adjusted by the collimating lens assembly 322 are converged to a small angle range. The optical path management module 3213 is used for changing and managing the propagating direction of the S-polarized lighting beams $L_{3S}$ within the beam recycling module 321. In this embodiment, the optical path management module 3213 comprises a first reflective element 32131, a second reflective element 32132A, and a second focusing lens assembly 32133. The first reflective element 32131 is arranged between the polarization beam splitter 324 and the second focusing lens assembly 32133. The second reflective element 32132A is arranged between the second focusing lens assembly 32133 and the total internal reflection prism 3211. The first reflective element 32131 and the second reflective element 32132A are used for reflecting the lighting beams that are projected thereon. The second focusing lens assembly 32133 is used for adjusting the incidence angles of the received lighting beams and outputting the adjusted lighting beams.

In the first exemplary projection system 3A, the first reflective element 32131 and the second reflective element 32132A are a first reflective mirror and a second reflective mirror, respectively. Alternatively, the first reflective element 32131 and the second reflective element 32132A are respectively a first polarizer and a second polarizer, wherein the P-polarized beams are transmissible through the first polarizer and the second polarizer, and the S-polarized beams are reflected by the first polarizer and the second polarizer.

By the polarization state conversion structure 3212, the S-polarized imaging beams $I_{3S}$ within the beam recycling module 321 are converted into the P-polarized lighting beams $L_{3P2}$. In the first exemplary projection system, the polarization state conversion structure 3212 is a half-wave plate, which is arranged between the second reflective element 32132A and the total internal reflection prism 3211. The position of the polarization state conversion structure 3212 is not restricted. For example, the polarization state conversion structure 3212 may be arranged between the polarization beam splitter 324 and the first reflective element 32131. Alternatively, the polarization state conversion structure 3212 may be arranged between the first reflective element 32131 and the second focusing lens assembly 32133. Alternatively, the polarization state conversion structure 3212 may be arranged between the second focusing lens assembly 32133 and the second reflective element 32132A. These modifications are not shown in the drawings. Due to the arrangement of the polarization state conversion structure 3212, the lighting beams are recycled by the beam recycling module 321 and the lighting beams incident into the total internal reflection prism 3211 are P-polarized lighting beams.

The operating principles of the projection system 3A will be illustrated as follows. Firstly, the lighting beams provided by the illumination device 31 are sequentially transmitted through the collimating lens assembly 322, the first incidence plane 32112 of the first prism 32111, the first facing plane 32113 of the first prism 32111, the second facing plane 32117 of the second prism 32115, the second prism plane 32118 of the second prism 32115 and the first focusing lens assembly 323, and then directed to the polarization beam splitter 324. The P-polarized lighting beams $L_{3P1}$ are transmitted through the polarization beam splitter 324, and then directed to the LCOS microdisplay element 33. The S-polarized lighting beams $L_{3S}$ are reflected by the polarization beam splitter 324. The S-polarized lighting beams $L_{3S}$ are continuously and sequentially reflected by the first reflective element 32131, transmitted through the second focusing lens assembly 32133, reflected by the second reflective element 32132A, and directed to the polarization state conversion structure 3212. By the polarization state conversion structure 3212, the S-polarized lighting beams $L_{3S}$ are converted into the P-polarized lighting beams $L_{3P2}$. Next, the P-polarized lighting beams $L_{3P2}$ are incident into the second prism 32115 through the second incidence plane 32116 of the second prism 32115, and subject to the total internal reflection on the second facing plane 32117 of the second prism 32115. The reflected P-polarized lighting beams $L_{3P2}$ are transmitted through the second prism plane 32118 of the second prism 32115 and the first focusing lens assembly 323, and then directed to the polarization beam splitter 324. Next, the P-polarized lighting beams $L_{3P2}$ are transmitted through the polarization beam splitter 324, and directed to the LCOS microdisplay element 33.

The P-polarized lighting beams $L_{3P1}$ and $L_{3P2}$ are reflected by the LCOS microdisplay element 33. Correspondingly, the P-polarized lighting beams $L_{3P1}$ and $L_{3P2}$ are converted into the S-polarized imaging beams $I_{3S}$ in response to the electronic image. The S-polarized imaging beams $I_{3S}$ are directed to and reflected by the polarization beam splitter 324. The reflected S-polarized imaging beams $I_{3S}$ are transmitted through the analyzer 325, and directed to the optical projection lens 34. After the S-polarized imaging beams $I_{3S}$ are received by the optical projection lens 34, the electronic image shown on the LCOS microdisplay element 33 is projected onto the screen 9 through the optical projection lens 34.

The concepts of the present invention may be further illustrated by referring to Snell's law. That is, if any beam is incident to the second facing plane 32117 of the second prism 32115 at a proper incidence angle, the beam can be transmitted through the second facing plane 32117 of the second prism 32115. Whereas, if the incidence angle is not proper, the total internal reflection occurs on the second facing plane 32117 of the second prism 32115. On the other hand, if any beam is incident to the second facing plane 32117 of the second prism 32115 at another proper incidence angle, the total internal reflection occurs on the second facing plane 32117 of the second prism 32115. Whereas, if the incidence angle is not proper, the beam is transmitted through the second facing plane 32117 of the second prism 32115. The operating principles of the Snell's law are well known to those skilled in the art, and are not redundantly described herein.

From the above discussions, the P-polarized lighting beams $L_{3P1}$ and the S-polarized lighting beams $L_{3S}$ are outputted from the illumination device 31, and the S-polarized lighting beams $L_{3S}$ are converted into the P-polarized lighting beams $L_{3P2}$ by the polarization state conversion structure 3212. The P-polarized lighting beams $L_{3P1}$, the S-polarized lighting beams $L_{3S}$ and the P-polarized lighting beams $L_{3P2}$ are all incident to the second facing plane 32117 of the second prism 32115 along the transmission paths. By adjusting the relative positions of the illumination device 31, the collimating lens assembly 322, the first focusing lens assembly 323, the first reflective element 32131, the second focusing lens assembly 32133 and/or the second reflective element 32132A, or adjusting the relative positions of any two components, or adjusting the shapes of the first prism 32111 and the second prism 32115 of the total internal reflection prism 3211, and adjusting and managing the incidence angle of any light beam relative to the second facing plane 32117 of the second prism 32115, the P-polarized lighting beams $L_{3P1}$ and the S-polarized lighting beams $L_{3S}$ provided by the illumination device 31 are transmissible through the second facing plane 32117 of the second prism 32115 of the total internal reflection prism 3211. In addition, after the S-polarized lighting beams $L_{3S}$ are converted into the P-polarized lighting beams $L_{3P2}$ by the polarization state conversion structure 3212, the P-polarized lighting beams $L_{3P2}$ are reflected by the second facing plane 32117 of the second prism 32115 of the total internal reflection prism 3211.

Preferably, the illumination device 31 is deviated from the lighting optical axis 35 of the projection system 3A, and the first prism 32111 and the second prism 32115 of the total internal reflection prism 3211 are both right triangular prisms (see FIG. 4). Alternatively, in some embodiments, the illumination device 31 is not deviated from the lighting optical axis 35 of the projection system 3A (not shown), and the first prism 32111 and the second prism 32115 of the total internal reflection prism 3211 are collectively combined as a parallelogram prism (not shown).

Moreover, if the lighting beams $L_{3P1}$ and $L_{3S}$ directly transmitted through the second facing plane 32117 of the second prism 32115 and the S-polarized lighting beams $L_{3S}$ reflected by the second facing plane 32117 of the second prism 32115 are asymmetrically outputted from the second prism plane 32118 of the second prism 32115, when the electronic image shown on the LCOS microdisplay element 33 is projected onto the screen 9, an asymmetrical aberration occurs. In a case that the illumination device 31 is deviated from the lighting optical axis 35 of the projection system 3A, the angle between the first facing plane 32113 of the first prism 32111 and the lighting optical axis 35 and the angle between the second facing plane 32117 of the second prism 32115 and the lighting optical axis 35 are both 45 degrees in order to minimize the asymmetrical aberration.

From the above discussions, according to the projection system 3A of the present invention, the S-polarized lighting beams $L_{3S}$ which are directed to and reflected by the polarization beam splitter 324 (i.e. the useless lighting beams for the LCOS microdisplay element 33) are recycled. After the polarization state of the recycled S-polarized lighting beams $L_{3S}$ is converted, the S-polarized lighting beams $L_{3S}$ can be reused. Assuming that the light amount from the illumination device 21 of the conventional projection system 2 and the light amount from the illumination device 31 of the projection system 3A, the projection system 3A can output higher luminance than the conventional projection system 2 because more S-polarized imaging beams $I_{3S}$ are received by optical projection lens 34 of the projection system 3A.

Figure 5:
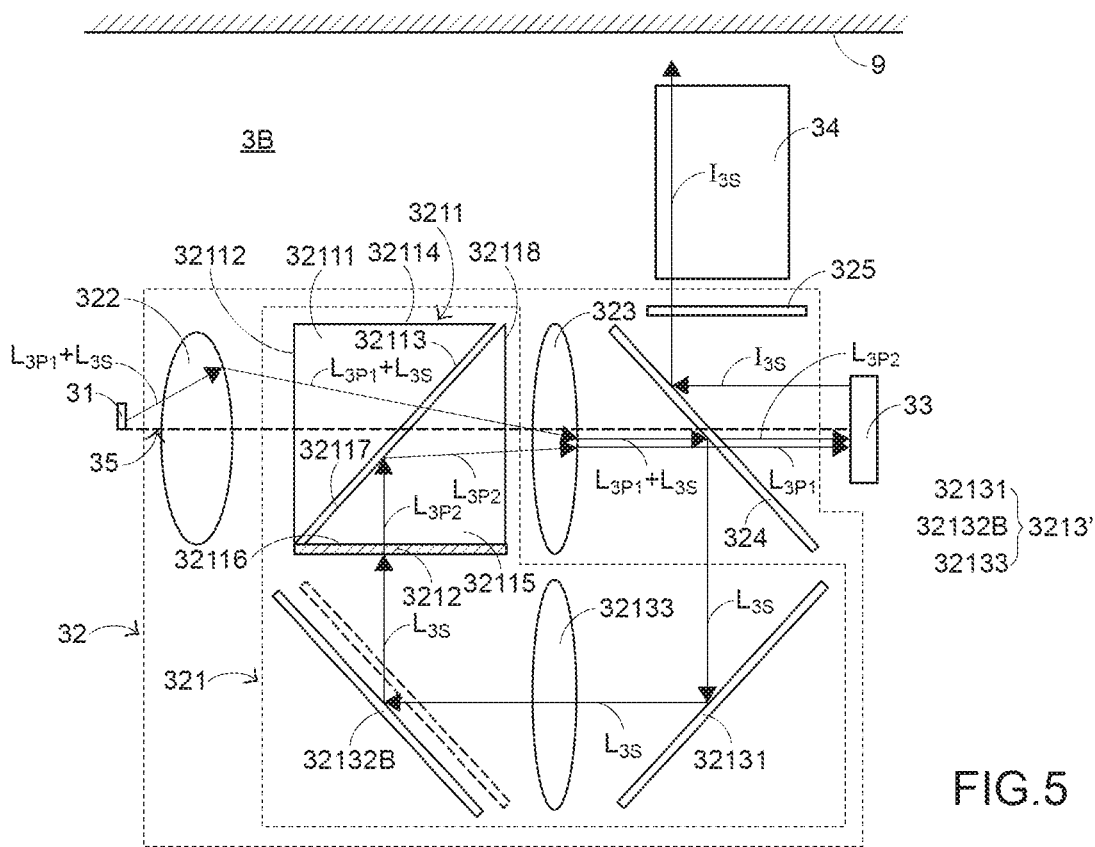
FIG. 5 is a schematic view illustrating the structure and the optical paths of a second exemplary projection system of FIG. 3.

FIG. 5 is a schematic view illustrating the structure and the optical paths of a second exemplary projection system of FIG. 3. Except for the following items, the second exemplary projection system 3B is substantially identical to the first exemplary projection system 3A, and is not redundantly described herein. In this projection system 3B, the optical path management module 3213' comprises a first reflective element 32131, a second reflective element 32132B, and a second focusing lens assembly 32133. In comparison with the second reflective element 32132A of the projection system 3A, the position and the tilt angle of the second reflective element 32132B are changed. As shown in FIG. 5, the dotted line denotes the position and the angle of the second reflective element 32132A. Consequently, after the S-polarized lighting beams $L_{3S}$ are converted into the P-polarized lighting beams $L_{3P2}$ by the polarization state conversion structure 3212, the position of the P-polarized lighting beam $L_{3P2}$ striking on the second facing plane 32117 of the second prism 32115 and resulting in the total internal reflection will be changed. Under this circumstance, the intensity and uniformity of the light beams projected on the LCOS microdisplay element 33 are enhanced.

Figure 6:
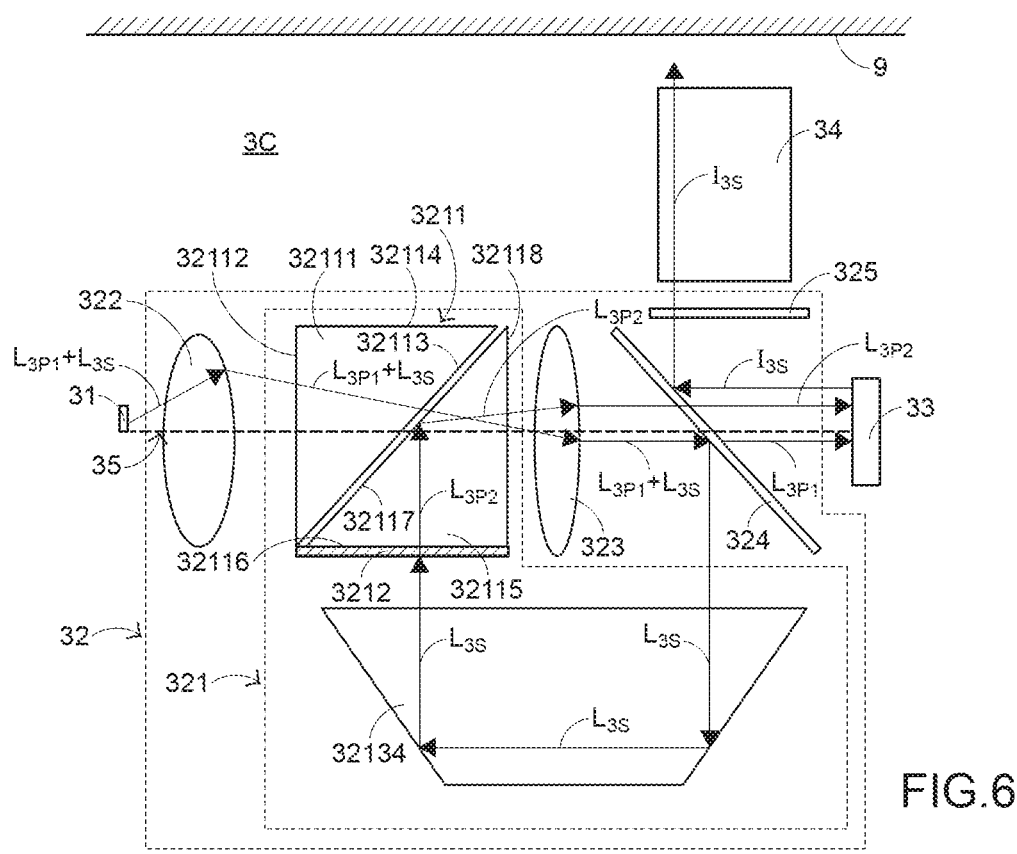
FIG. 6 is a schematic view illustrating the structure and the optical paths of a third exemplary projection system of FIG. 3.

FIG. 6 is a schematic view illustrating the structure and the optical paths of a third exemplary projection system of FIG. 3. Except for the following items, the third exemplary projection system 3C is substantially identical to the first exemplary projection system 3A, and is not redundantly described herein. In this projection system 3C, the first reflective element 32131, the second focusing lens assembly 32133 and the second reflective element 32132A used in the first exemplary projection system 3A are replaced by a trapezoidal prism 32134. In addition, the polarization state conversion structure 3212 is arranged between the trapezoidal prism 32134 and the second prism 32115. Alternatively, the polarization state conversion structure 3212 is arranged between trapezoidal prism 32134 and the polarization beam splitter 324.

Figure 7:
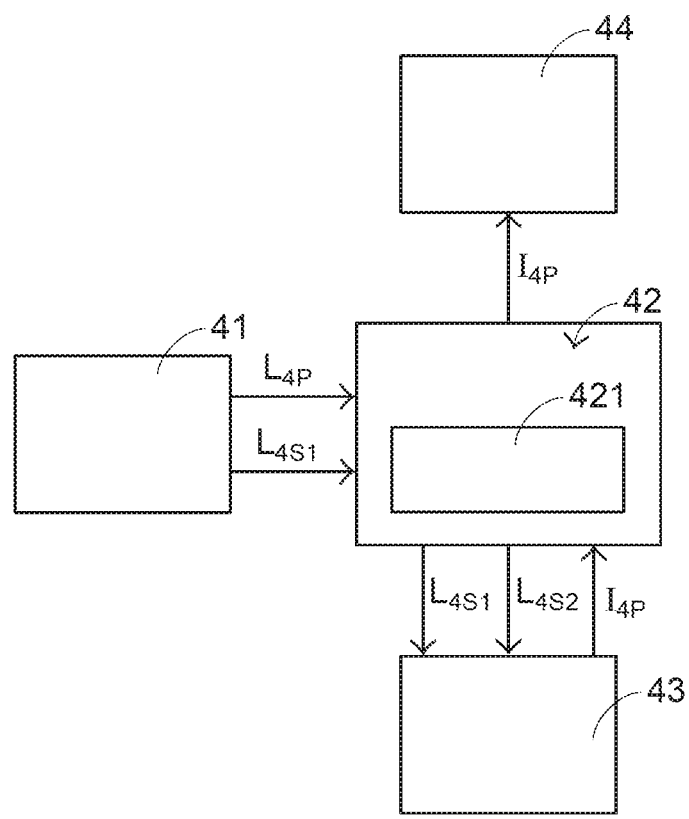
FIG. 7 is a schematic functional block diagram illustrating a projection system according to a second embodiment of the present invention.

FIG. 7 is a schematic functional block diagram illustrating a projection system according to a second embodiment of the present invention. As shown in FIG. 7, the projection system 4 comprises an illumination device 41, a beam processing module 42, a LCOS microdisplay element 43, and an optical projection lens 44. The illumination device 41 has a light source. The light source is for example a light emitting diode (LED) or an ultra-high pressure lamp (UHP lamp). The light source has a wide illumination range. Preferably, the light source has a 180-degree illumination range (e.g. from 0 to 180 degrees). The illumination device 41 is located at a lighting optical axis or located at a side of the lighting optical axis.

The source ray provided by the illumination device 41 may be divided into two parts, i.e. P-polarized lighting beams $L_{4P}$ and S-polarized lighting beams $L_{4S1}$. The LCOS microdisplay element 43 is used for showing an electronic image. Moreover, only the lighting beams in the S-polarized state need to be provided to the LCOS microdisplay element 43. That is, the lighting beams in the P-polarized state are not necessarily provided to the LCOS microdisplay element 43.

In this embodiment, the beam processing module 42 at least comprises a beam recycling module 421. In addition, the beam processing module 42 is arranged between the illumination device 41, the LCOS microdisplay element 43 and the optical projection lens 44. The lighting beams $L_{4P}$ and $L_{4S1}$ provided by the illumination device 41 are directed to the beam processing module 42. The S-polarized lighting beams $L_{4S1}$ are directly outputted to the LCOS microdisplay element 43. More especially, by the beam recycling module 421, the P-polarized lighting beams $L_{4P}$ are converted into S-polarized lighting beams $L_{4S2}$, which are further outputted to the LCOS microdisplay element 43.

Once the S-polarized lighting beams $L_{4S1}$ and $L_{4S2}$ are projected onto the LCOS microdisplay element 43, the S-polarized lighting beams $L_{4S1}$ and $L_{4S2}$ are reflected by the LCOS microdisplay element 43. Correspondingly, the S-polarized lighting beams $L_{4S1}$ and $L_{4S2}$ are converted into the P-polarized imaging beams $I_{4P}$ in response to the electronic image. The P-polarized imaging beams $I_{4P}$ are transmitted through the beam processing module 42, and then directed to the optical projection lens 44. The P-polarized imaging beams $I_{4P}$ are projected onto a screen through the optical projection lens 44. Consequently, the electronic image shown on the LCOS microdisplay element 43 is projected onto the screen.

The present invention will now be described more specifically with reference to the following embodiments. It is to be noted that the following descriptions of preferred embodiments of this invention are presented herein for purpose of illustration and description only. However, those skilled in the art will readily observe that numerous modifications and alterations may be made while retaining the teachings of the invention.

Figure 8:
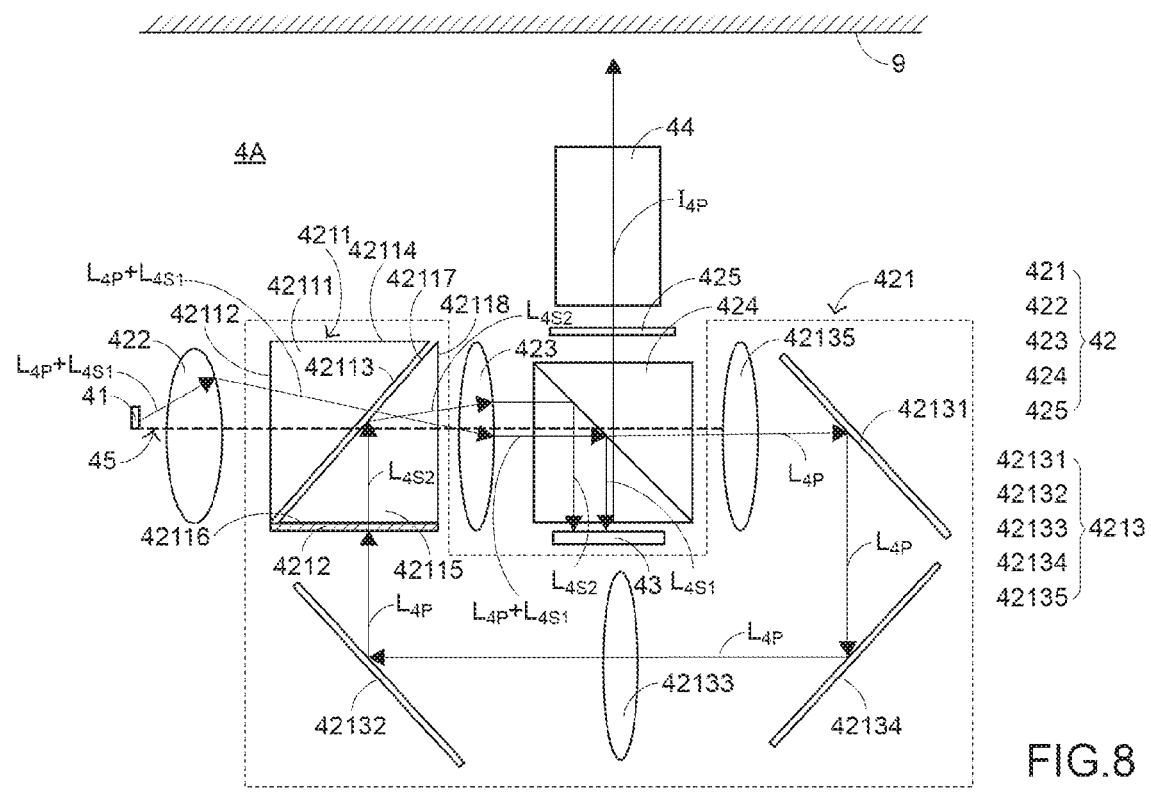
FIG. 8 is a schematic view illustrating the structure and the optical paths of a first exemplary projection system of FIG. 7.

FIG. 8 is a schematic view illustrating the structure and the optical paths of a first exemplary projection system of FIG. 7. In the projection system 4A of FIG. 8, the beam processing module 42 comprises the beam recycling module 421, a collimating lens assembly 422, a first focusing lens assembly 423, a polarization beam splitter (PBS) 424, and an analyzer 425. The beam recycling module 421 comprises a total internal reflection (TIR) prism 4211, a polarization state conversion structure 4212, and an optical path management module 4213.

The collimating lens assembly 422 is arranged between the illumination device 41 and the total internal reflection prism 4211. The first focusing lens assembly 423 is arranged between the total internal reflection prism 4211 and the polarization beam splitter 424. The polarization beam splitter 424 is arranged between the LCOS microdisplay element 43 and the analyzer 425. The analyzer 425 is arranged between the polarization beam splitter 424 and the optical projection lens 44.

In the first exemplary projection system 4A, the total internal reflection prism 4211 comprises a first prism 42111 and a second prism 42115. The first prism 42111 and the second prism 42115 are both triangular prisms. The first prism 42111 comprises a first incidence plane 42112, a first facing plane 42113, and a first prism plane 42114. The first prism plane 42114 is arranged between the first incidence plane 42112 and the first facing plane 42113. The second prism 42115 comprises a second incidence plane 42116, a second facing plane 42117, and a second prism plane 42118. The second prism plane 42118 is arranged between the second incidence plane 42116 and the second facing plane 42117. The first facing plane 42113 of the first prism 42111 and the second facing plane 42117 of the second prism 42115 face each other, and are separated from each other by a gap.

The polarization beam splitter 424 is used for passing through the P-polarized beams and reflecting the S-polarized beams. That is, only the P-polarized beams are transmissible through the polarization beam splitter 424. The analyzer 425 is used for blocking the S-polarized beams in order to filter off undesired light beams and prevent the undesired light beams from being directed to the optical projection lens 44. In addition, only the P-polarized beams are transmissible through the analyzer 425. It is noted that the analyzer 425 is not an essential component in this embodiment.

The collimating lens assembly 422 and the first focusing lens assembly 423 are used for adjusting the incidence angles of the received light beams and outputting the adjusted light beams. The light beams adjusted by the collimating lens assembly 422 are converged to a small angle range. The optical path management module 4213 is used for changing and managing the propagating direction of the P-polarized lighting beams $L_{4P}$ within the beam recycling module 421. In this embodiment, the optical path management module 4213 comprises a first reflective element 42131, a second reflective element 42132, a third reflective element 42134, a second focusing lens assembly 42133, and a third focusing lens assembly 42135. The third focusing lens assembly 42135 is arranged between the polarization beam splitter 424 and the first reflective element 42131. The third reflective element 42134 is arranged between the first reflective element 42131 and the second focusing lens assembly 42133. The second reflective element 42132 is arranged between the second focusing lens assembly 42133 and the total internal reflection prism 4211. The first reflective element 42131, the second reflective element 42132 and the third reflective element 42134 are used for reflecting the lighting beams that are projected thereon. The second focusing lens assembly 42133 and the third focusing lens assembly 42135 are used for adjusting the incidence angles of the received lighting beams and outputting the adjusted lighting beams.

By the polarization state conversion structure 4212, the P-polarized lighting beams $L_{4P}$ within the beam recycling module 421 are converted into the S-polarized lighting beams $L_{4S2}$. In the first exemplary projection system 4A, the polarization state conversion structure 4212 is a half-wave plate, which is arranged between the second reflective element 42132 and the total internal reflection prism 4211. The position of the polarization state conversion structure 4212 is not restricted. For example, the polarization state conversion structure 4212 may be arranged between the polarization beam splitter 424 and the third focusing lens assembly 42135. Alternatively, the polarization state conversion structure 4212 may be arranged between the third focusing lens assembly 42135 and the first reflective element 42131. Alternatively, the polarization state conversion structure 4212 may be arranged between the first reflective element 42131 and the third reflective element 42134. Alternatively, the polarization state conversion structure 4212 may be arranged between the third reflective element 42134 and the second focusing lens assembly 42133. Alternatively, the polarization state conversion structure 4212 may be arranged between the second focusing lens assembly 42133 and the second reflective element 42132. These modifications are not shown in the drawings. Due to the arrangement of the polarization state conversion structure 4212, the lighting beams are recycled by the beam recycling module 421 and the lighting beams incident into the total internal reflection prism 4211 are S-polarized lighting beams.

The operating principles of the projection system 4A will be illustrated as follows. Firstly, the lighting beams $L_{4P}$ and $L_{4S1}$ provided by the illumination device 41 are sequentially transmitted through the collimating lens assembly 422, the first incidence plane 42112 of the first prism 42111, the first facing plane 42113 of the first prism 42111, the second facing plane 42117 of the second prism 42115, the second prism plane 42118 of the second prism 42115 and the first focusing lens assembly 423, and then directed to the polarization beam splitter 424. The S-polarized lighting beams $L_{4S1}$ are reflected by the polarization beam splitter 424, and then directed to the LCOS microdisplay element 43. The P-polarized lighting beams $L_{4P}$ are directly transmitted through the polarization beam splitter 424. The P-polarized lighting beams $L_{4P}$ are continuously and sequentially transmitted through the third focusing lens assembly 42135, reflected by the first reflective element 32131, reflected by the third reflective element 42134, transmitted through the second focusing lens assembly 42133, reflected by the second reflective element 42132, and directed to the polarization state conversion structure 4212. By the polarization state conversion structure 3212, the P-polarized lighting beams $L_{4P}$ are converted into the S-polarized lighting beams $L_{4S2}$.

Next, the S-polarized lighting beams $L_{4S2}$ are incident into the second prism 42115 through the second incidence plane 42116 of the second prism 42115, and subject to the total internal reflection on the second facing plane 42117 of the second prism 42115. The reflected S-polarized lighting beams $L_{4S2}$ are transmitted through the second prism plane 42118 of the second prism 42115 and the first focusing lens assembly 423, and then directed to the polarization beam splitter 424. Next, the S-polarized lighting beams $L_{4S2}$ are transmitted through the polarization beam splitter 424, and directed to the LCOS microdisplay element 43.

The S-polarized lighting beams $L_{4S1}$ and $L_{4S2}$ are reflected by the LCOS microdisplay element 43. Correspondingly, the S-polarized lighting beams $L_{4S1}$ and $L_{4S2}$ are converted into the P-polarized imaging beams $I_{4P}$ in response to the electronic image. The P-polarized imaging beams $I_{4P}$ are directed to and transmitted through the polarization beam splitter 424, and then transmitted through the analyzer 425, and directed to the optical projection lens 44. After the P-polarized imaging beams $I_{4P}$ are received by the optical projection lens 44, the electronic image shown on the LCOS microdisplay element 43 is projected onto the screen 9 through the optical projection lens 44.

The concepts of the present invention may be further illustrated by referring to Snell's law. That is, if any beam is incident to the second facing plane 42117 of the second prism 42115 at a proper incidence angle, the beam can be transmitted through the second facing plane 42117 of the second prism 42115. Whereas, if the incidence angle is not proper, the total internal reflection occurs on the second facing plane 42117 of the second prism 42115. On the other hand, if any beam is incident to the second facing plane 42117 of the second prism 42115 at another proper incidence angle, the total internal reflection occurs on the second facing plane 42117 of the second prism 42115. Whereas, if the incidence angle is not proper, the beam is transmitted through the second facing plane 42117 of the second prism 42115. The operating principles of the Snell's law are well known to those skilled in the art, and are not redundantly described herein.

From the above discussions, the P-polarized lighting beams $L_{4P}$ and the S-polarized lighting beams $L_{4S1}$ are outputted from the illumination device 41, and the P-polarized lighting beams $L_{4P}$ are converted into the S-polarized lighting beams $L_{4S2}$ by the polarization state conversion structure 4212. The P-polarized lighting beams $L_{4P}$, the S-polarized lighting beams $L_{4S1}$ and the S-polarized lighting beams $L_{4S2}$ are all incident to the second facing plane 42117 of the second prism 42115 along the transmission paths. By adjusting the relative positions of the illumination device 41, the collimating lens assembly 422, the first focusing lens assembly 423, the third focusing lens assembly 42135, the first reflective element 42131, the third reflective element 42134, the second focusing lens assembly 42133 and/or the second reflective element 42132, or adjusting the relative positions of any two components, or adjusting the shapes of the first prism 42111 and the second prism 42115 of the total internal reflection prism 4211, and adjusting and managing the incidence angle of any light beam relative to the second facing plane 42117 of the second prism 42115, the P-polarized lighting beams $L_{4P}$ and the S-polarized lighting beams $L_{4S1}$ provided by the illumination device 41 are transmissible through the second facing plane 42117 of the second prism 42115 of the total internal reflection prism 4211. In addition, after the P-polarized lighting beams $L_{4P}$ are converted into the S-polarized lighting beams $L_{4S2}$ by the polarization state conversion structure 4212, the S-polarized lighting beams $L_{4S2}$ are reflected by the second facing plane 42117 of the second prism 42115 of the total internal reflection prism 4211.

Preferably, the illumination device 41 is deviated from the lighting optical axis 45 of the projection system 4A, and the first prism 42111 and the second prism 42115 of the total internal reflection prism 4211 are both right triangular prisms (see FIG. 8). Alternatively, in some embodiments, the illumination device 41 is not deviated from the lighting optical axis 45 of the projection system 4A (not shown), and the first prism 42111 and the second prism 42115 of the total internal reflection prism 4211 are collectively combined as a parallelogram prism (not shown).

Moreover, if the lighting beams $L_{4P}$ and $L_{4S1}$ directly transmitted through the second facing plane 42117 of the second prism 42115 and the S-polarized lighting beams $L_{4S2}$ reflected by the second facing plane 42117 of the second prism 42115 are asymmetrically outputted from the second prism plane 42118 of the second prism 42115, when the electronic image shown on the LCOS microdisplay element 43 is projected onto the screen 9, an asymmetrical aberration occurs. In a case that the illumination device 41 is deviated from the lighting optical axis 45 of the projection system 4A, the angle between the first facing plane 42113 of the first prism 42111 and the lighting optical axis 45 and the angle between the second facing plane 42117 of the second prism 42115 and the lighting optical axis 45 are both 45 degrees in order to minimize the asymmetrical aberration.

From the above discussions, according to the projection system 4A of the present invention, the P-polarized lighting beams $L_{4P}$ which are directed to and transmitted the polarization beam splitter 424 (i.e. the useless lighting beams for the LCOS microdisplay element 43) are recycled. After the polarization state of the recycled P-polarized lighting beams $L_{4P}$ is converted, the P-polarized lighting beams $L_{4P}$ can be reused. Assuming that the light amount from the illumination device 11 of the conventional projection system 1 and the light amount from the illumination device 41 of the projection system 4A, the projection system 4A can output higher luminance than the conventional projection system 1 because more P-polarized imaging beams $I_{4P}$ are received by optical projection lens 44 of the projection system 4A.

Figure 9:
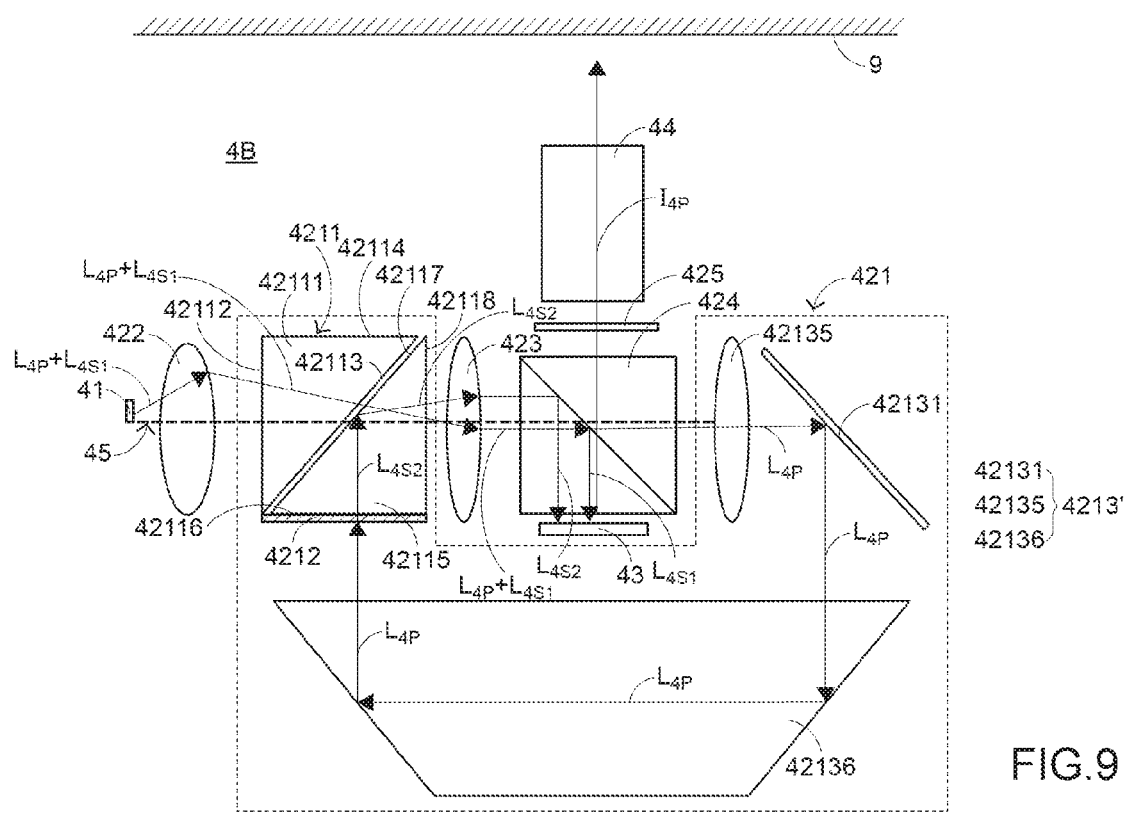
FIG. 9 is a schematic view illustrating the structure and the optical paths of a second exemplary projection system of FIG. 7.

FIG. 9 is a schematic view illustrating the structure and the optical paths of a second exemplary projection system of FIG. 7. Except for the following items, the second exemplary projection system 4B is substantially identical to the first exemplary projection system 4A, and is not redundantly described herein. In this projection system 4B, the third reflective element 42134, the second focusing lens assembly 42133 and the second reflective element 42132 used in the first exemplary projection system 4A are replaced by a trapezoidal prism 42136. That is, the optical path management module 4213' of the projection system 4B comprises the first reflective element 42131, the third focusing lens assembly 42135, and the trapezoidal prism 42136 (not shown).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A LCOS projection system, comprising:
   an illumination device for providing a plurality of lighting beams;
   a LCOS microdisplay element for showing an electronic image;
   a polarization beam splitter, wherein a first portion of said lighting beams are transmissible through said polarization beam splitter and directed to said LCOS microdisplay element, wherein when said first portion of said lighting beams are reflected by said LCOS microdisplay element, said lighting beams are converted into a plurality of imaging beams in response to said electronic image;
   an optical projection lens for receiving said imaging beams and projecting said imaging beams onto a screen; and
   a beam recycling module, wherein when a second portion of said lighting beams from said polarization beam splitter are introduced into said beam recycling module, a polarization state of said second portion of said lighting beams is converted by said beam recycling module, and said second portion of said lighting beams in said converted polarization state are directed to said polarization beam splitter again, wherein said beam recycling module at least comprises a total internal reflection prism, wherein said lighting beams from said illumination device are transmissible through said total internal reflection prism, and said second portion of said lighting beams from said polarization beam splitter are subject to a total internal reflection on said total internal reflection prism, wherein said total internal reflection prism is arranged between said illumination device and said polarization beam splitter and comprises a first prism and a second prism, said first prism comprises a first incidence plane and a first facing plane, said second prism comprises a second incidence plane and a second facing plane, and said first facing plane and said second facing plane face each other, and wherein said LCOS projection system has a lighting optical axis, a first angle between said first facing plane of said first prism and said lighting optical axis and a second angle between said second facing plane of said second prism and said lighting optical axis are both 45 degrees, said first prism and said second prism are both right triangular prisms if said illumination device is deviated from said lighting optical axis, and said first prism and said second prism are collectively combined as a parallelogram prism if said illumination device is not deviated from said lighting optical axis.

2. The LCOS projection system according to claim 1, wherein any P-polarized beam of said lighting beams is transmissible through said polarization beam splitter, and any S-polarized beam of said lighting beams is reflected by said polarization beam splitter.

3. The LCOS projection system according to claim 2, further comprising an analyzer, wherein said analyzer is arranged between said polarization beam splitter and said optical projection lens for blocking any P-polarized beam of said imaging beams from being incident into said optical projection lens, or blocking any S-polarized beam of said imaging beams from being incident into said optical projection lens.

4. The LCOS projection system according to claim 2, wherein said beam recycling module further comprises a polarization state conversion structure for converting said polarization state of said second portion of said lighting beams, wherein said second portion of said lighting beams from said polarization beam splitter are transmitted through said polarization state conversion structure and then directed to said total internal reflection prism.

5. The LCOS projection system according to claim 4, wherein said polarization state conversion structure is a half-wave plate.

6. The LCOS projection system according to claim 4, wherein said beam recycling module further comprises an optical path management module for changing a propagating direction of said second portion of said lighting beams.

7. The LCOS projection system according to claim 6, further comprising:

a collimating lens assembly arranged between said illumination device and said total internal reflection prism for adjusting an incidence angle of any received lighting beam and outputting said adjusted lighting beam; and a first focusing lens assembly arranged between said total internal reflection prism and said polarization beam splitter for adjusting an incidence angle of any received lighting beam and outputting said adjusted lighting beam.

8. The LCOS projection system according to claim 6, wherein said optical path management module at least comprises a trapezoidal prism, wherein said second portion of said lighting beams from said polarization beam splitter are at least transmitted through said trapezoidal prism, and directed to said second prism of said total internal reflection prism, wherein said optical path management module is arranged between said polarization beam splitter and said trapezoidal prism, or said optical path management module is arranged between said trapezoidal prism and said second prism; or wherein said optical path management module at least comprises a first reflective element and a second reflective element for reflecting any lighting beam projected thereon and comprises a second focusing lens assembly for adjusting an incidence angle of any received lighting beam and outputting said adjusted lighting beam, wherein said second reflective element is arranged between said second focusing lens assembly and said total internal reflection prism, wherein light intensity and light uniformity of said LCOS microdisplay are changeable according to a position and a tilt angle of said second reflective element.

9. The LCOS projection system according to claim 8, wherein said first portion of said lighting beams are P-polarized beams, and said second portion of said lighting beams are S-polarized beams.

10. The LCOS projection system according to claim 9, wherein said first reflective element and said second reflective element are respectively a first reflective mirror and a second reflective mirror, or said first reflective element and said second reflective element are respectively a first polarizer and a second polarizer, wherein any P-polarized beam is transmissible through said first polarizer and said second polarizer, and any S-polarized beam is reflected by said first polarizer and said second polarizer, wherein said second portion of said lighting beams from said polarization beam splitter are at least sequentially transmitted through said first reflective element, said second focusing lens assembly, said second reflective element and said second prism of said total internal reflection prism and subject to a total internal reflection on said second facing plane of said second prism, wherein said polarization state conversion structure is arranged between said polarization beam splitter and said first reflective element, or said polarization state conversion structure is arranged between said first reflective element and said second focusing lens assembly, or said polarization state conversion structure is arranged between said second focusing lens assembly and said second reflective element, or said polarization state conversion structure is arranged between said second reflective element and said second prism.

11. The LCOS projection system according to claim 8, wherein said first portion of said lighting beams are S-polarized beams, and said second portion of said lighting beams are P-polarized beams.

12. The LCOS projection system according to claim 11, wherein said optical path management module further comprises a third reflective element for reflecting any lighting beam projected thereon and comprises a third focusing lens assembly for adjusting an incidence angle of any received lighting beam and outputting said adjusted lighting beam, wherein said second portion of said lighting beams from said polarization beam splitter are at least sequentially transmitted through said third focusing lens assembly, said first reflective element, said third reflective element, said second focusing lens assembly, said second reflective element and said second prism of said total internal reflection prism and subject to a total internal reflection on said second facing plane of said second prism, wherein said polarization state conversion structure is arranged between said polarization beam splitter and said third focusing lens assembly, or said polarization state conversion structure is arranged between said third focusing lens assembly and said first reflective element, or said polarization state conversion structure is arranged between said first reflective element and said third reflective element, or said polarization state conversion structure is arranged between said third reflective element and said second focusing lens assembly, or said polarization state conversion structure is arranged between said second focusing lens assembly and said second reflective element, or said polarization state conversion structure is arranged between said second reflective element and said second prism.

13. The LCOS projection system according to claim 1, wherein said illumination device has a light source, said light source is a light emitting diode or an ultra-high pressure lamp, and said light source has an illumination range between 0 and 180 degrees, wherein said illumination device is located at a lighting optical axis or located at a side of said lighting optical axis.

14. A LCOS projection system, comprising:
an illumination device for providing a plurality of first lighting beams in a first polarization state and a plurality of second lighting beams in a second polarization state;
a LCOS microdisplay element for showing an electronic image, wherein when any lighting beam is directed to and reflected by said LCOS microdisplay element, said lighting beam is converted into an imaging beam in response to said electronic image;
an optical projection lens; and
a beam processing module arranged between said illumination device, said LCOS microdisplay element and said optical projection lens, wherein when said first lighting beams in said first polarization state are received by said beam processing module, said first lighting beams in said first polarization state are outputted from said beam processing module to said LCOS microdisplay element, wherein when said second lighting beams in said second polarization state are received by said beam processing module, said second polarization state of said second lighting beams is converted into said first polarization state by said beam processing module, and said second lighting beams in said first polarization state are outputted from said beam processing module to said LCOS microdisplay element, wherein when said imaging beam is received by said beam processing module, said imaging beam is outputted from beam processing module to said optical projection lens, wherein said beam processing module at least comprises a total internal reflection prism, wherein said total internal reflection prism is arranged in a transmission path of said second lighting beams after said second polarization state of said second lighting beams is converted into said first polarization state, and said total internal reflection prism is also arranged in a transmission path of said first lighting beams and said second lighting beams from said illumination device,
wherein said total internal reflection prism comprises a first prism and a second prism, said first prism comprises a first incidence plane and a first facing plane, said second prism comprises a second incidence plane and a second facing plane, and said first facing plane and said second facing plane face each other, and
wherein said LCOS projection system has a lighting optical axis, a first angle between said first facing plane of said first prism and said lighting optical axis and a second angle between said second facing plane of said second prism and said lighting optical axis are both 45 degrees, said first prism and said second prism are both right triangular prisms if said illumination device is deviated from said lighting optical axis, and said first prism and said second prism are collectively combined as a parallelogram prism if said illumination device is not deviated from said lighting optical axis.

15. The LCOS projection system according to claim 14, wherein said beam processing module further comprises a polarization beam splitter, wherein any P-polarized beam is transmissible through said polarization beam splitter, and any S-polarized beam is reflected by said polarization beam splitter.

16. The LCOS projection system according to claim 14, further comprising an analyzer, wherein said analyzer is arranged between said polarization beam splitter and said optical projection lens for blocking any P-polarized beam of said imaging beams from being incident into said optical projection lens, or blocking any S-polarized beam of said imaging beams from being incident into said optical projection lens.

17. The LCOS projection system according to claim 14, wherein said beam processing module further comprises a polarization state conversion structure for converting said second polarization state of said second lighting beams into said first polarization state, wherein said second lighting beams in said second polarization state and from said polarization beam splitter are transmitted through said polarization state conversion structure and then directed to said total internal reflection prism.

18. The LCOS projection system according to claim 17, wherein said polarization state conversion structure is a half-wave plate.

19. The LCOS projection system according to claim 17, wherein said beam processing module further comprises an optical path management module for changing a propagating direction of said second lighting beams in said second polarization state.

20. The LCOS projection system according to claim 19, wherein said beam processing module further comprises:
a collimating lens assembly arranged between said illumination device and said total internal reflection prism for adjusting an incidence angle of any received lighting beam and outputting said adjusted lighting beam; and
a first focusing lens assembly arranged between said total internal reflection prism and said polarization beam splitter for adjusting an incidence angle of any received lighting beam and outputting said adjusted lighting beam.

21. The LCOS projection system according to claim 19, wherein said optical path management module at least comprises a trapezoidal prism, wherein said second lighting beams in said second polarization state and from said polarization beam splitter are at least transmitted through said trapezoidal prism, and directed to said second prism of said total internal reflection prism, wherein said optical path management module is arranged between said polarization beam splitter and said trapezoidal prism, or said optical path management module is arranged between said trapezoidal prism and said second prism; or
wherein said optical path management module at least comprises a first reflective element and a second reflective element for reflecting any lighting beam projected thereon and comprises a second focusing lens assembly for adjusting an incidence angle of any received lighting beam and outputting said adjusted lighting beam, wherein said second reflective element is arranged between said second focusing lens assembly and said total internal reflection prism, wherein light intensity and light uniformity of said LCOS microdisplay are changeable according to a position and a tilt angle of said second reflective element.

22. The LCOS projection system according to claim 21, wherein any lighting beam in said first polarization state is a P-polarized beam, and any lighting beam in said second polarization state is an S-polarized beam.

23. The LCOS projection system according to claim 22, wherein said first reflective element and said second reflective element are respectively a first reflective mirror and a second reflective mirror, or said first reflective element and said second reflective element are respectively a first polarizer and a second polarizer, wherein any P-polarized beam is transmissible through said first polarizer and said second polarizer, and any S-polarized beam is reflected by said first polarizer and said second polarizer, wherein said second lighting beams in said second polarization state and from said polarization beam splitter are at least sequentially transmitted through said first reflective element, said second focusing lens assembly, said second reflective element and said second prism of said total internal reflection prism and subject to a total internal reflection on said second facing plane of said second prism, wherein said polarization state conversion structure is arranged between said polarization beam splitter and said first reflective element, or said polarization state conversion structure is arranged between said first reflective element and said second focusing lens assembly, or said polarization state conversion structure is arranged between said second focusing lens assembly and said second reflective element, or said polarization state conversion structure is arranged between said second reflective element and said second prism.

24. The LCOS projection system according to claim 21, wherein any lighting beam in said first polarization state is an S-polarized beam, and any lighting beam in said second polarization state is a P-polarized beam.

25. The LCOS projection system according to claim 24, wherein said optical path management module further comprises a third reflective element for reflecting any lighting beam projected thereon and comprises a third focusing lens assembly for adjusting an incidence angle of any received lighting beam and outputting said adjusted lighting beam, wherein said second lighting beams in said second polarization state and from said polarization beam splitter are at least sequentially transmitted through said third focusing lens assembly, said first reflective element, said third reflective element, said second focusing lens assembly, said second reflective element and said second prism of said total internal reflection prism and subject to a total internal reflection on said second facing plane of said second prism, wherein said polarization state conversion structure is arranged between said polarization beam splitter and said third focusing lens assembly, or said polarization state conversion structure is arranged between said third focusing lens assembly and said first reflective element, or said polarization state conversion structure is arranged between said first reflective element and said third reflective element, or said polarization state conversion structure is arranged between said third reflective element and said second focusing lens assembly, or said polarization state conversion structure is arranged between said second focusing lens assembly and said second reflective element, or said polarization state conversion structure is arranged between said second reflective element and said second prism.

26. The LCOS projection system according to claim 14, wherein said illumination device has a light source, said light source is a light emitting diode or an ultra-high pressure lamp, and said light source has an illumination range between 0 and 180 degrees, wherein said illumination device is located at a lighting optical axis or located at a side of said lighting optical axis.

27. A LCOS projection system, comprising:
an illumination device providing a plurality of lighting beams;
a LCOS microdisplay element showing an electronic image;
a polarization beam splitter splitting said lighting beams into at least a first portion and a second portion, wherein said first portion of said lighting beams are transmitted through said polarization beam splitter and directed to said LCOS microdisplay element, and said first portion of said lighting beams are reflected by said LCOS microdisplay element and converted into a plurality of imaging beams corresponding to said electronic image;
an optical projection lens receiving said imaging beams and projecting said imaging beams onto a screen; and
a beam recycling module disposed in a light path between said illumination device and said polarization beam splitter, passing therethrough said lighting beams before said lighting beams are split by said polarization beam splitter, receiving said second portion of said lighting beams from said polarization beam splitter, converting a polarization state of said second portion of said lighting beams and returning said second portion of said lighting beams in said converted polarization state to said polarization beam splitter, wherein said second portion of said lighting beams in said converted polarization state is transmissible through said polarization beam splitter.

28. The LCOS projection system according to claim 27, wherein any P-polarized beam of said lighting beams is transmissible through said polarization beam splitter, and any S-polarized beam of said lighting beams is reflected by said polarization beam splitter.

* * * * *